April 17, 1956  A. L. HESTON  2,741,799

METHOD OF MAKING TIRES

Filed July 27, 1953  3 Sheets-Sheet 1

INVENTOR.
ALLEN L. HESTON
BY
Oberlin & Limbach
ATTORNEYS.

INVENTOR.
ALLEN L. HESTON
BY
Oberlin & Limbach
ATTORNEYS

April 17, 1956 A. L. HESTON 2,741,799
METHOD OF MAKING TIRES
Filed July 27, 1953 3 Sheets-Sheet 3

INVENTOR.
ALLEN L. HESTON
BY
Oberlin & Limbach
ATTORNEYS.

ously described in detail construction of such press, it has been

United States Patent Office 2,741,799
Patented Apr. 17, 1956

2,741,799

METHOD OF MAKING TIRES

Allen L. Heston, Akron, Ohio, assignor to National Rubber Machinery Company, Akron, Ohio, a corporation of Ohio Application July 27, 1953, Serial No. 370,367

6 Claims. (Cl. 18—53)

The present invention relates generally to an improved method of making tires and especially to a method of shaping and preparing undercut shoulder-built tires for curing in presses which both shape and cure the tires.

Truck tires and other large, heavy tires are built in partially shaped undercut form of C-shaped cross section on shouldered drums in order that the amount of distortion which the cords of the reinforcing plies undergo during final shaping will be minimized whereby the shaped and cured tires will have good endurance and operating characteristics. The generally C-shaped cross section of undercut shoulder-built tires presents problems in shaping and preparing tires of this type for cure in shaping and curing type presses, because the axial length of the generally cylindrical and radially expansible diaphragm of the shaping device is substantially greater than the distance between the beads of the tire. Because of this difference in length, it has been difficult to expand the diaphragm into the cavity of the tire as the diaphragm tends to expand in the area which is not surrounded by the tire and causes a radial swelling or "gum boil" between the tire and the mold sections. This swelling of the diaphragm has interfered with proper operation of the press and has caused failure of the diaphragm.

The problem is not as acute with passenger tires which are built on the flat faced drums in a generally cylindrical shape because the axial length of the cylindrical expansible diaphragm of the shaping device of the press is substantially equal to the distance between the beads of the tire. Consequently, upon inflation of the diaphragm and movement of the beads together, the tire is urged radially outward along its entire length by the diaphragm and is shaped into a hollow annular form for engagement by the mold surface.

Using the shaping and curing presses for heavy duty undercut shoulder-built tires is further complicated by the increased difficulty in seating the beads of the tire on the bead ring. The bead portions of truck and other heavy duty undercut shoulder-built tires have six, eight, or more reinforcing plies wrapped around the beads which results in spongy bead portions of a diameter smaller than that of the seating surfaces of the bead rings of the mold sections of the tire curing and shaping press. In addition, the problem is greater with heavy duty tires than with passenger tires because the interior bead surface of this type of tire is cylindrical rather than tapered as in passenger car tires. Both the cylindrical shape of the bead ring interior surface and the thick spongy nature of the bead portions (which decreases their internal diameters) have made it increasingly difficult to provide proper seating of the bead portions. The operator also has been unable to watch the progress of the seating of the top bead because the downwardly moving upper mold section has obstructed his view.

Another difficulty which has been experienced is that in expanding the diaphragm within the green tire, air is pocketed between the two rubber members—that is, the diaphragm and the green tire—thereby causing flaws in the tire during curing. This difficulty is especially prevalent where the tire is of the undercut shoulder-built type, because of the original difference in shape between the green tire and the diaphragm.

Accordingly, it is one principal object of this invention to provide a method by which the aforesaid difficulties or problems with respect to undercut shoulder-built tires are eliminated to thus avoid spoilage thereof.

Other objects of this invention are to provide a method by which the above-mentioned difficulties are avoided by preventing the diaphragm from projecting out of the green tire during the shaping operation; to provide for partially shaping the tire before engagement of both mold sections with the tire; and to provide means for expanding and contracting the tire and/or pulsating the diaphragm during the shaping operation to eliminate pocketing of air.

Other objects and advantages will become apparent as the following description proceeds.

To the accomplishment of the foregoing and related ends, the invention, then, comprises the features hereinafter fully described and particularly pointed out in the claims, the following description and the annexed drawings setting forth in detail one illustrative embodiment of the invention, this being indicative, however, of but one of the various ways in which the principle of the invention may be employed.

Figure 1:
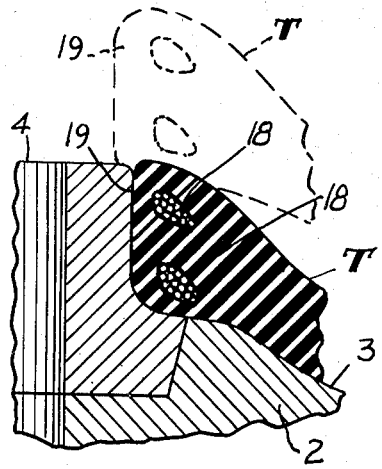
Fig. 1 is an enlarged fragmentary cross-section view showing in full lines one bead of an undercut shoulder-built tire properly seated in the toe ring and associated mold section and showing in dotted lines the initial condition of said bead having an inside diameter smaller than the outside diameter of the toe ring.

The press for practicing the present invention is preferably of the type which is fully illustrated and described in the co-pending application of Paul A. Frank, Serial No. 230,009, filed June 5, 1951; and rather than to illustrate in detail the construction of such press, it has been deemed sufficient for the present purposes to illustrate such press in somewhat diagrammatic form as in Figs. 2 to 10. By reference to Fig. 4, the general press construction will be evident; and, as shown therein, the same comprises a base 1 which carries a bottom mold section 2 thereon provided with an upwardly facing molding surface 3 and including a toe ring 4 having a cylindrical exterior surface corresponding to the inside diameter of the bead of the finished tire to be shaped and cured in the press. The upper press head 5 is a vertically reciprocated by suitable means such as illustrated in the aforesaid Frank application and carries a top mold section 6 having a downwardly facing molding surface 7 which together with the molding surface 3 of the bottom mold section 2 defines a molding cavity of tire shape when said mold sections are in closed mating engagement as best shown in Fig. 8.

The base 1 of the press is formed with a well including concentric cylinders 8 and 9 and in the space therebetween is an annular piston 10 which is adapted to raise and lower the tire shaping device 11 carried by said piston 10; and in cylinder 9 is a piston 12 which has its adjustable length rod 13 secured to the upper head 14 of said shaping device 11. The annular piston 10 is herein shown as constituting the lower head of said shaping device. Said shaping device heads 10 and 14 each comprise a pair of ring or disc-like members clamping the opposite beaded edges of a radially expansible diaphragm 15 therebetween, said diaphragm in its unexpanded condition being of generally cylindrical form.

The toe ring 16 of the top mold section 6 is carried at the lower end of the rod portion 17 of a piston which is adapted to be vertically reciprocated in a cylinder formed within the upper press head 5, said toe ring 16 being vertically movable with respect to said top mold section 6 for a purpose which will hereinafter appear.

Figure 2:
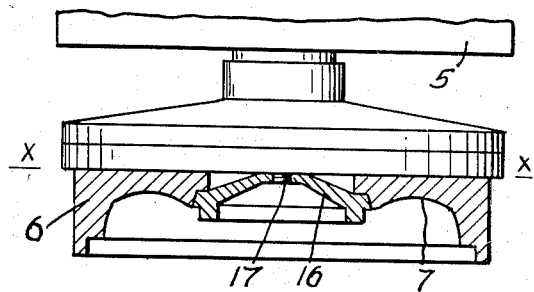
Figs. 2 to 8 are cross-section views, somewhat diagrammatic in character, illustrating one form of apparatus for performing the present method, and illustrating the successive steps constituting the present method.
Figure 2:
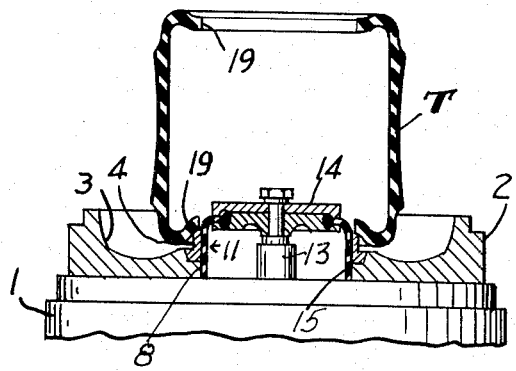
Figure 4:
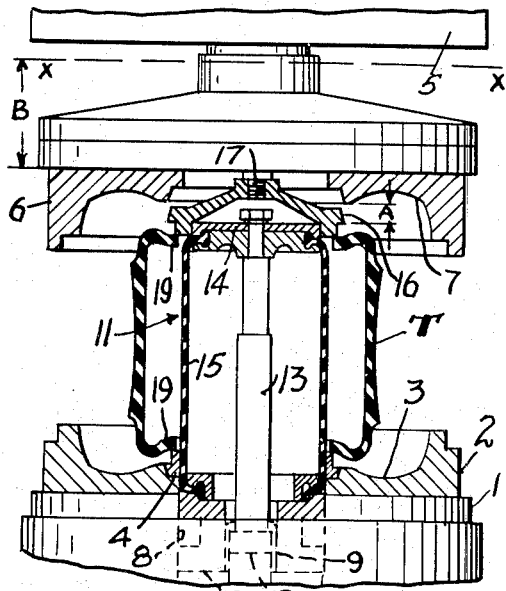

The cylinder or well 8 in base 1 of the press is preferably of a depth such that the shaping device in its normal cylindrical, extended condition as shown in Fig. 4 can be substantially wholly retracted to the position shown in Fig. 2 so as to facilitate positioning of the undercut shoulder-built tire carcass T in proper position resting on the bottom mold section 2 without requiring lifting of the carcass over the shaping device 11 as is required in many presses currently in use.

Fig. 1 is an enlarged fragmentary cross-section view of the bottom mold section 2 and the toe ring 4 around the inner marginal edge. The finished undercut shoulder-built tire T is shown in full lines and usually comprises a pair of generally triangular shaped bundles of steel wires 18, 18 around which is wrapped usually six, eight, or more plies of rubber-impregnated fabric or the like to form the tire beads 19, 19. The tire T as originally built has an inside diameter at the beads 19, 19 thereof somewhat less than the outside diameter of the toe ring 4 and also less than the desired inside diameter of the beads of the finished tire, this being due to the great number of layers of ply stock and also to the spongy character thereof. One requirement is that the beads 19, 19 of the carcass T be properly set around the toe rings 4 and 16 of the mold sections 2 and 6 or the tire T will be spoiled, thus involving considerable expense for material, labor, etc.

Having thus described the general construction of one form of press for shaping tires, reference will now be made to the successive steps of the present method.

In Fig. 2 the press is open with the shaping device 11 retracted into the well 8 whereby an uncured, undercut shoulder-built tire carcass T may be laterally inserted between the separated mold sections 2 and 6 and positioned so as to rest on the top edge of the toe ring 4, the line X—X denoting a datum plane.

Figure 3:
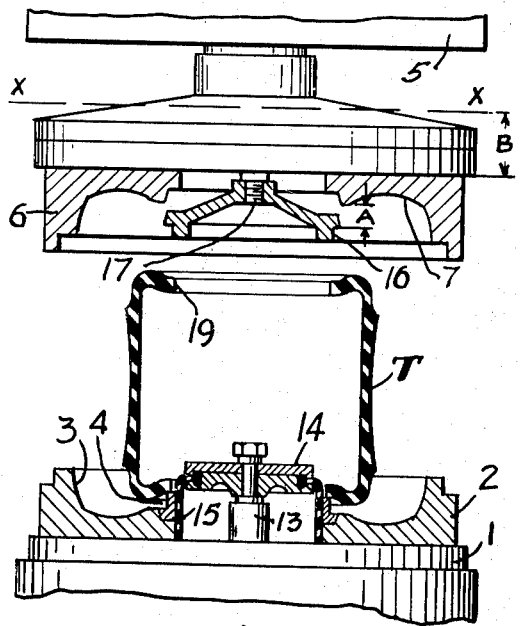

In Fig. 3 the toe ring 16 has been moved downwardly with respect to the top mold section 6 a distance "A" and the press head 5 is being lowered at the same time, having so far moved down the distance "B" from the datum plane X—X.

Next, as shown in Fig. 4, the downward movement of the press head 5 and thus of the mold section 6 and toe ring 16 is interrupted temporarily so that fluid under pressure (usually air) acting on the annular piston or lower diaphragm head 10 causes the shaping device 11 to move upwardly until the upper diaphragm head 14 is seated within the toe ring 16. At this position of the press parts, the toe ring 16 has just contacted the top bead 19 of the tire carcass T.

The piston 12 is preferably continuously urged upwardly by air pressure so as to yieldably maintain the shaping device heads 10 and 14 spaced apart and to constitute an air spring which yieldably resists movement of said heads axially toward each other during the closing movement of the press.

Figure 5:
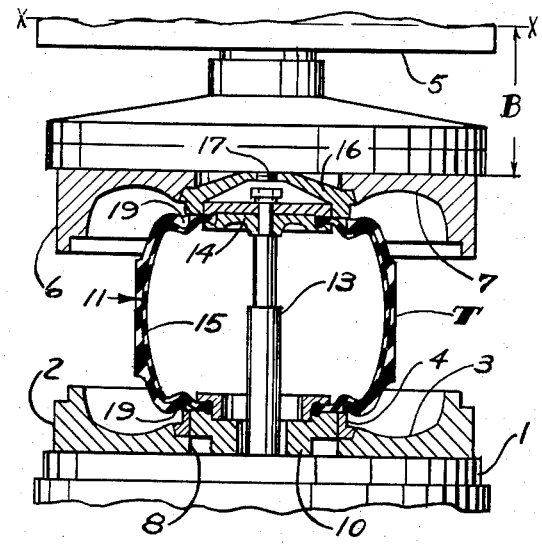
Figure 6:
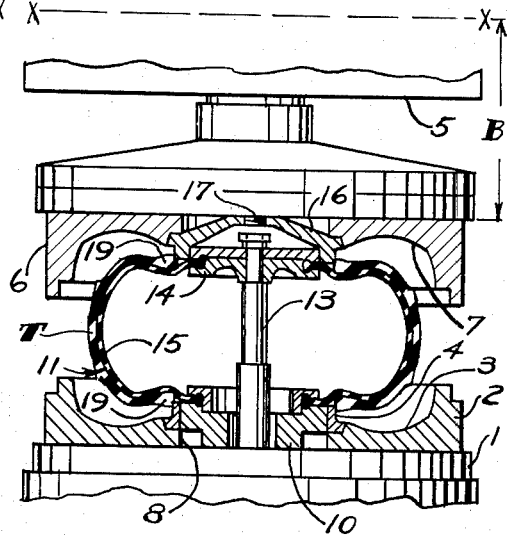

As shown in Fig. 5, the press head 5 now moves downwardly with respect to the toe ring 16 to contact the latter and to move the same downwardly while the lower diaphragm head 10 is moved upwardly to position the ends of the diaphragm 15 in the planes of the edges of the toe rings 4 and 16. At the same time that the foregoing occurs, the shaping device 11 is inflated to cause radial expansion of the diaphragm 15 into uniform pressure engagement around the entire interior surface of the tire carcass T. This expansion of the diaphragm 15 tensions the layers of plystock around the respective bead rings 18, 18 to an extent such that as the press head 5 continues to move downwardly, as shown in Fig. 6, the beads 19, 19 will have partly telescoped over the respective toe rings 4 and 16. As evident from Figs. 5 and 6, the inflation of the shaping device 11 does not cause the diaphragm 15 to "gum boil" since there are no crevices or gaps into which it can expand.

Figure 7:
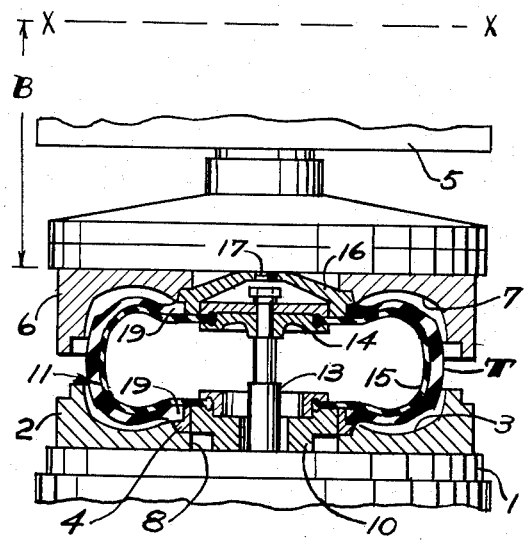
Figure 8:
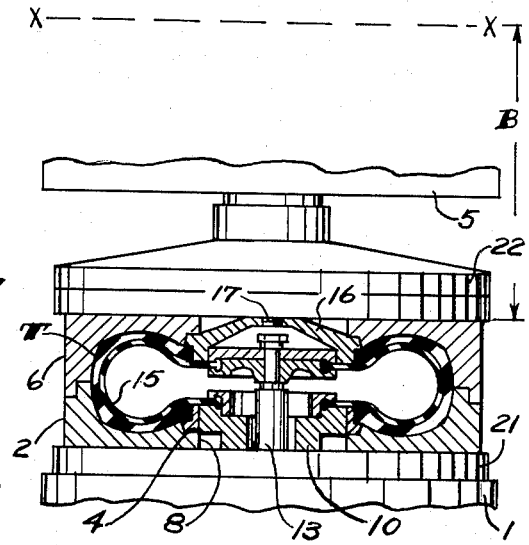

Fig. 7 shows a further stage in the present method, and at this time the beads 19, 19 of the tire carcass T are fully and properly seated around the exterior cylindrical surfaces of the toe rings 4 and 16 by the combination of expanding force exerted on the carcass T by the diaphragm 15 and the axial pressure exerted during the movement of the press head 5 and top mold section 6 downwardly closer to mating engagement with the bottom mold section 2.

It is to be noted that the progress of the seating of the beads 19, 19 of the carcass T around the toe rings 4 and 16 can be seen in Fig. 6 and therefore, if for some reason, said beads are not commencing to properly be seated by this time, the press operation can be immediately discontinued and the necessary corrective measures taken to cause the beads to properly seat.

The press is shown in its closed position in Fig. 8 with the carcass T shaped to finished tire form and held in such form by pressure exerted by diaphragm 15. Of course, at this closed position, if not before, curing medium under pressure will be circulated through said diaphragm 15 and also through platens 21 and 22 disposed adjacent the respective mold sections 2 and 6 whereby the shaped tire will be cured or vulcanized.

The opening of the press occurs somewhat in a reverse sequence starting with Fig. 8 and at the Fig. 7 stage of opening the beads 19, 19 are spread apart to break tread from the mold sections 2 and 6. The bottom mold section 2 is preferably treated with anti-sticking compound so that the cured tire T will stick in the top mold section 6 and therefore, as the press continues to open, the upper diaphragm head 14 will follow the upward movement of the press head 5, thereby radially contracting and stripping the diaphragm 15 out of the cured tire. When the press is fully open, the shaping device 11 is retracted to the position of Fig. 2 and the top toe ring 16 is then shifted downwardly with respect to the top mold section 6 so as to eject the cured tire T onto a suitable platform or conveyor which has been inserted in the space between the separated mold sections.

After the cured tire T has been thus ejected or discharged, the toe ring 16 may be returned to the position shown in Fig. 2 or it may be left in the position shown in Fig. 3 since even in the last-mentioned position, sufficient clearance will remain for the lateral insertion of the next tire carcass T which is to be shaped and cured.

Figure 9:
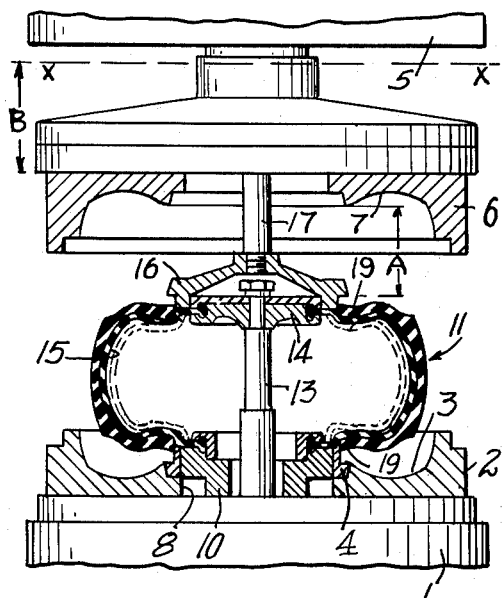
Figs. 9 and 10 illustrate variations in the method.
Figure 10:
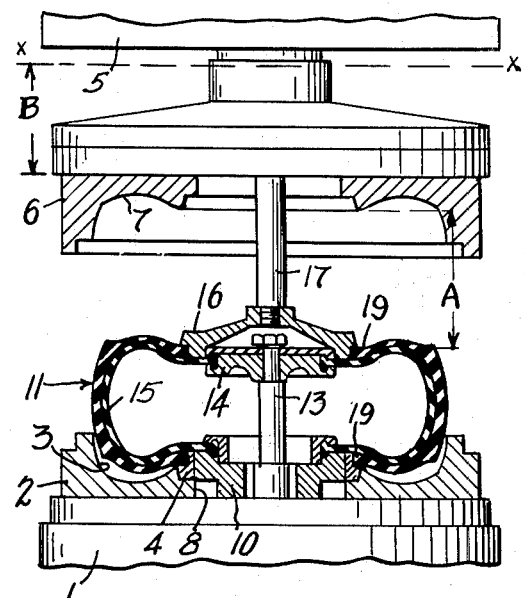

In Figs. 9 and 10 are shown a variation in the method which involves retention of the upper press head 5 at the Fig. 4 position while the toe ring 16 is moved downwardly to the Figs. 6 and 7 positions increasing the distance "A" as shown and retaining the distance "B" from datum plane X—X the same as in Fig. 4. With the press parts in the Fig. 9 and 10 positions, there is unobstructed vision of the top toe ring 16 so that the progress of the seating of the top bead 19 of the carcass T may be carefully watched. Similarly, the progress of the seating of the bottom bead 19 on toe ring 4 may be watched, although not with the same degree of clarity as the top bead 19.

At this state of the method, the toe ring 16 may be reciprocated up and down through a relative short stroke to work out any air pockets between the shaping device 11 and the carcass T and at the same time, or in lieu of such reciprocation of toe ring 16, the fluid pressure in the shaping device may be alternately increased and decreased to alternately engage and disengage the shaping device 11 from the carcass T. In this way, any air pockets are worked out between the beads 19, 19 and the toe rings 4 and 16. In Fig. 9, the deflated or reduced pressure condition of the diaphragm 15 is shown in dot-dash lines.

Other modes of applying the principle of the inven-

I therefore, particularly point out and distinctly claim as my invention:

1. In the method of forming a finished tire from an undercut shoulder-built tire carcass having a tubular body and inturned beads at its ends and by means of a shaping device which has a radially expansible and generally cylindrical wall portion of greater length between its ends than the distance between such beads and which is expanded to deform the carcass into a tire-shaped cavity defined by complementary mold sections; the steps which comprise relatively positioning the carcass, the shaping device, and the mold sections to form a substantially closed annular space composed of the inside surfaces of the beads and body and a portion of the length of the exterior surface of the wall portion of the shaping device, decreasing the distance between the ends of such wall portion to position such wall portion in its entirety between the beads, radially expanding the wall portion into outwardly deforming engagement within the carcass while moving the beads axially toward each other, and alternately moving the beads in opposite directions to eliminate pocketing of air between the carcass and the wall portion of the shaping device.

2. In the method of forming a finished tire from an undercut shoulder-built tire carcass having a tubular body and inturned beads at its ends and by means of a shaping device which has a radially expansible and generally cylindrical wall portion of greater length between its ends than the distance between such beads and which is expanded to deform the carcass into a tire-shaped cavity defined by complementary mold sections; the steps which comprise relatively positioning the carcass, the shaping device, and the mold sections to form a substantially closed annular space composed of the inside surfaces of the beads and body and a portion of the length of the exterior surface of the wall portion of the shaping device, decreasing the distance between the ends of such wall portion to position such wall portion in its entirety between the beads, radially expanding the wall portion into outwardly deforming engagement within the carcass while moving the beads axially toward each other, and alternately increasing and decreasing fluid pressure within the shaping device to engage and disengage the wall portion thereof with the carcass to thereby eliminate pocketing of air between the carcass and the wall portion of the shaping device.

3. In the method of forming a tire from a carcass having a tubular body and beads at its ends and by means of a shaping device which has a radially expansible wall portion for deforming the carcass into a tire-shaped cavity defined by complementary mold sections; the steps which comprise relatively positioning the carcass in surrounding relation to the shaping device, inflating the latter while moving the beads axially toward each other, and alternately moving the beads in opposite directions to eliminate pocketing of air between the carcass and the wall portion of the shaping device.

4. In the method of forming a tire from a carcass having a tubular body and beads at its ends and by means of a shaping device which has a radially expansible wall portion for deforming the carcass into a tire-shaped cavity defined by complementary mold sections; the steps which comprise relatively positioning the carcass in surrounding relation to the shaping device, inflating the latter while moving the beads axially toward each other, and alternately increasing and decreasing fluid pressure within the shaping device to engage and disengage the wall portion thereof with the carcass to thereby eliminate pocketing of air between the carcass and the wall portion of the shaping device.

5. In the method of forming a finished tire from an uncured carcass which is generally cylindrical in form but in which the inside diameter of the beads is less than the corresponding diameter of the finished tire as determined by the outside diameter of cylindrical bead-contacting surfaces on the mold within which the tire is cured and the axial distance between the planes of the beads is substantially less than the distance between such beads measured along the inner surface of the carcass, the steps of supporting such uncured carcass on the bead ring member of the lower complementary half of a curing mold, with the axis of the carcass in line with the axis of such mold half, moving axially into such carcass a substantially cylindrical, radially and axially deformable forming member which is supported between axially spaced heads which with said forming member provide an enclosure for the admission of fluid under pressure to deform radially outwardly said forming member, such forming member having an axial extent substantially greater than said axial distance between the planes of the beads of the uncured carcass, and such forming member initially extending axially outwardly of one of said planes, increasing the fluid pressure within said enclosure to force said forming member into contact with the inner periphery of the carcass centrally thereof, then decreasing the distance between said heads while continuing to increase the pressure within said enclosure, and then progressively closing the mold sections onto each other in conformity with the movement toward each other of the beads of the carcass.

6. In a method of forming a finished tire from an undercut shoulder-built tire carcass having a tubular body and inturned beads at its ends and by means of the conjoint action of (1) complementary top and bottom mold sections which have bead-contacting portions effective to move the beads toward each other as the mold sections are relatively moved vertically toward each other to mating engagement and (2) a shaping device which has heads at its opposite ends similarly moved toward each other substantially in the planes of such bead-contacting portions and a radially expansible and generally cylindrical wall portion secured at its ends to said heads and being of greater length between said heads than the distance between such beads of the tire carcass and which wall portion is progressively expanded to deform the carcass to tire shape as the beads thereof and said heads are moved toward each other; the steps which comprise placing a carcass in upright position between the mold sections with one bead thereof resting on the bead-contacting portion of the bottom mold section; relatively moving the mold sections toward each other to close the gap between the other bead and the bead-contacting portion of the top mold section; then with one head of said shaping device positioned substantially in the plane of the bead-contacting portion of one mold section, moving the other head of said shaping device to substantially the plane of the bead-contacting portion of the other mold section whereby such wall portion is positioned in its entirety within the carcass and between such beads without opportunity for gum-boiling through the previously closed gaps between the beads and the bead-contacting portions of said mold sections; and then continuing relative movement of said mold sections and said beads to progressively deform said carcass as aforesaid to finished tire shape.

References Cited in the file of this patent

UNITED STATES PATENTS

| 1,947,258 | Gay | Feb. 13, 1934 |
| 2,296,800 | Soderquist | Sept. 22, 1942 |
| 2,495,663 | Soderquist | Jan. 24, 1950 |
| 2,559,119 | Frank | July 3, 1951 |